(No Model.)

W. H. & H. S. BOWLER.
DUMPING CART.

No. 481,843. Patented Aug. 30, 1892.

Witnesses
Geo. E. Frick.
Rob. W. Fitzgerald

Inventors
W. H. Bowler
H. S. Bowler
By Lehmann, Pattison & Nesbit
Attorneys

UNITED STATES PATENT OFFICE.

WILLIAM H. BOWLER AND HARRY S. BOWLER, OF O'FALLON, ILLINOIS.

DUMPING-CART.

SPECIFICATION forming part of Letters Patent No. 481,843, dated August 30, 1892.

Application filed April 26, 1892. Serial No. 430,697. (No model.)

*To all whom it may concern:*

Be it known that we, WILLIAM H. BOWLER and HARRY S. BOWLER, of O'Fallon, in the county of St. Clair and State of Illinois, have invented certain new and useful Improvements in Dumping-Carts; and we do hereby declare the following to be a full, clear, and exact description of the invention, such as will enable others skilled in the art to which it pertains to make and use it, reference being had to the accompanying drawings, which form part of this specification.

Our invention relates to an improvement in dumping-carts; and it consists in the novel features of construction which will be fully described hereinafter, and more particularly referred to in the claim.

The object of our invention is to provide an improved cart which is designed more especially for hauling fodder and other similar matter which is long and bulky. The advantages claimed are having the wheels entirely beneath the cart-bottom and also the improved means for dumping the same.

Figure 1:
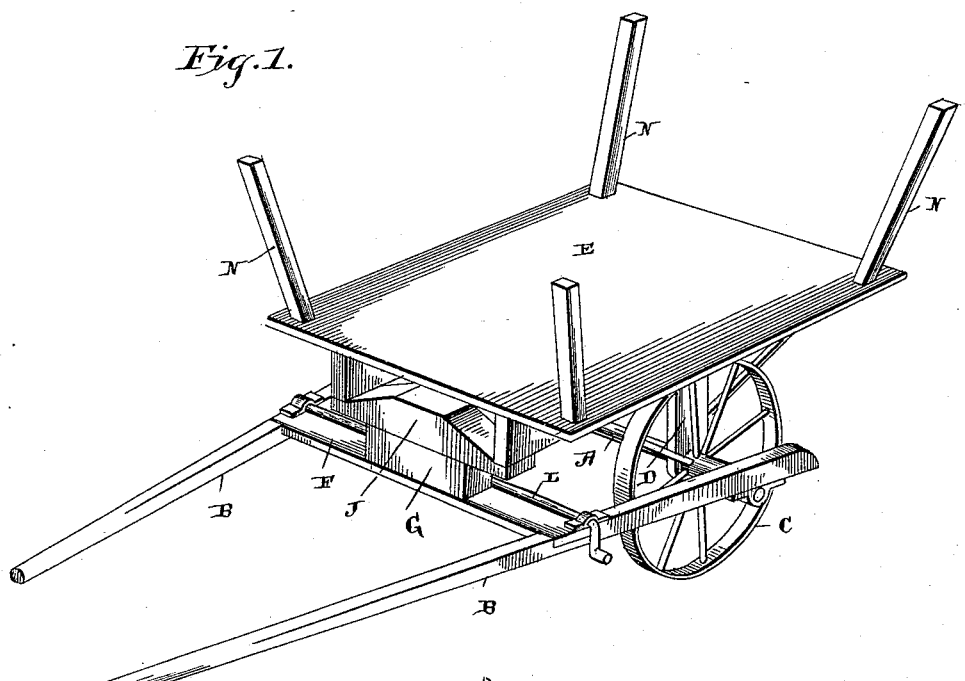
Figure 2:
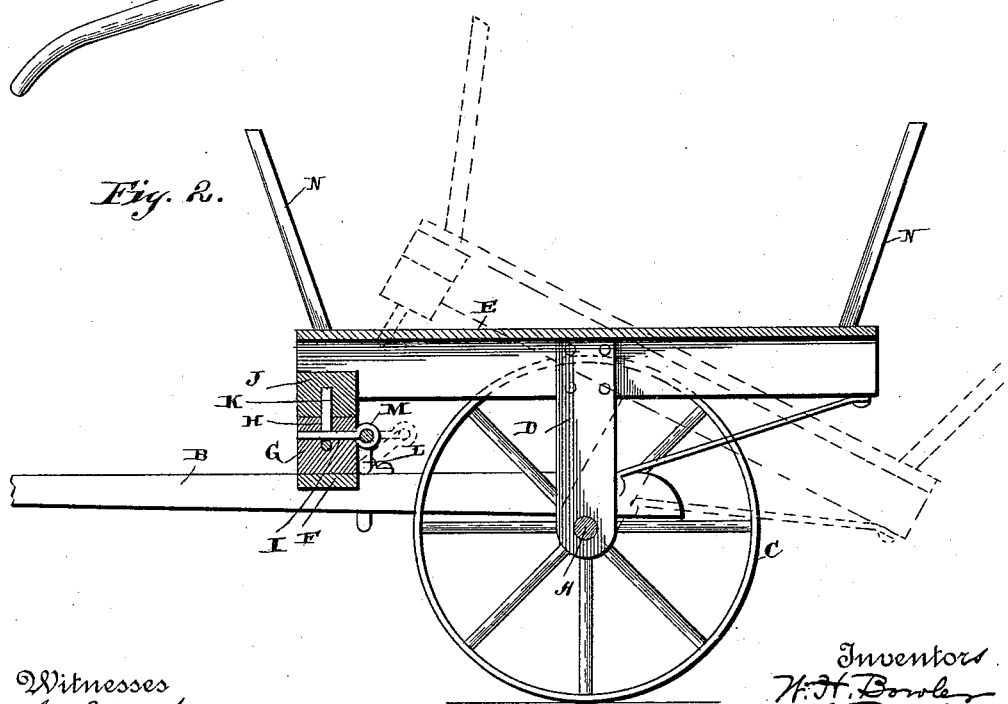

Referring to the accompanying drawings, Figure 1 is a perspective view of our improved cart. Fig. 2 is a longitudinal sectional view.

A represents the axle; B, the shafts, which are secured at their rear ends to the ends of the axle, and C the wheels, which are mounted on the axle between the shafts, as shown. Projecting upward from the axle between the wheels are the vertical standards D, which rise above the wheels, and supported on their upper ends is the platform E, which is quite broad, projecting entirely over the wheels and substantially shielding them from contact with anything that may be placed on the cart for transportation. Connecting the shafts just forward of the wheels is the cross-bar F, and supported thereon is the block G, having the vertical recess H and the horizontal opening I, leading to said recess. Upon the under forward end of the platform E is the block J, which rests on the block G, and projecting from this block is the staple K, which enters the recess G and projects past the passage H.

Journaled across the shafts B, just back of the bar F, is the rock-shaft L, having a crank on each end, as shown. This shaft is looped between its ends, and secured to this loop is the bolt M, which projects through the passage H and through the staple K, holding the front of the cart down and preventing it from dumping. When it is desired to dump the cart, the shaft L is turned by means of its cranks, withdrawing the bolt M, and the staple being thus freed the platform may be tilted rearward on the axle A by the standards D turning thereon.

Uprights N are provided for holding the load of fodder or other matter in position on the platform, and when it is desired to dump the cart the rear standards may be removed.

By means of our improved construction a cart is provided in which all the gearing is beneath the body, and thus is exempt from becoming entangled with the matter which is being hauled.

Having thus described our invention, we claim—

The combination of an axle, wheels mounted thereon, shafts projecting forward from the axle, vertical standards pivotally supported at their lower ends on the axle and which are of a length greater than the radius of the wheels, a platform supported by the standards which projects over the wheels, and a means for securing together the platform and the shafts, substantially as shown and described.

In testimony whereof we affix our signatures in presence of two witnesses.

WILLIAM H. BOWLER.
HARRY S. BOWLER.

Witnesses:
ERNST TIEDEMANN,
JOS. P. ISCH.